No. 893,496. PATENTED JULY 14, 1908.
B. I. HEAD.
LUBRICATOR.
APPLICATION FILED APR. 1, 1908.
3 SHEETS—SHEET 1.
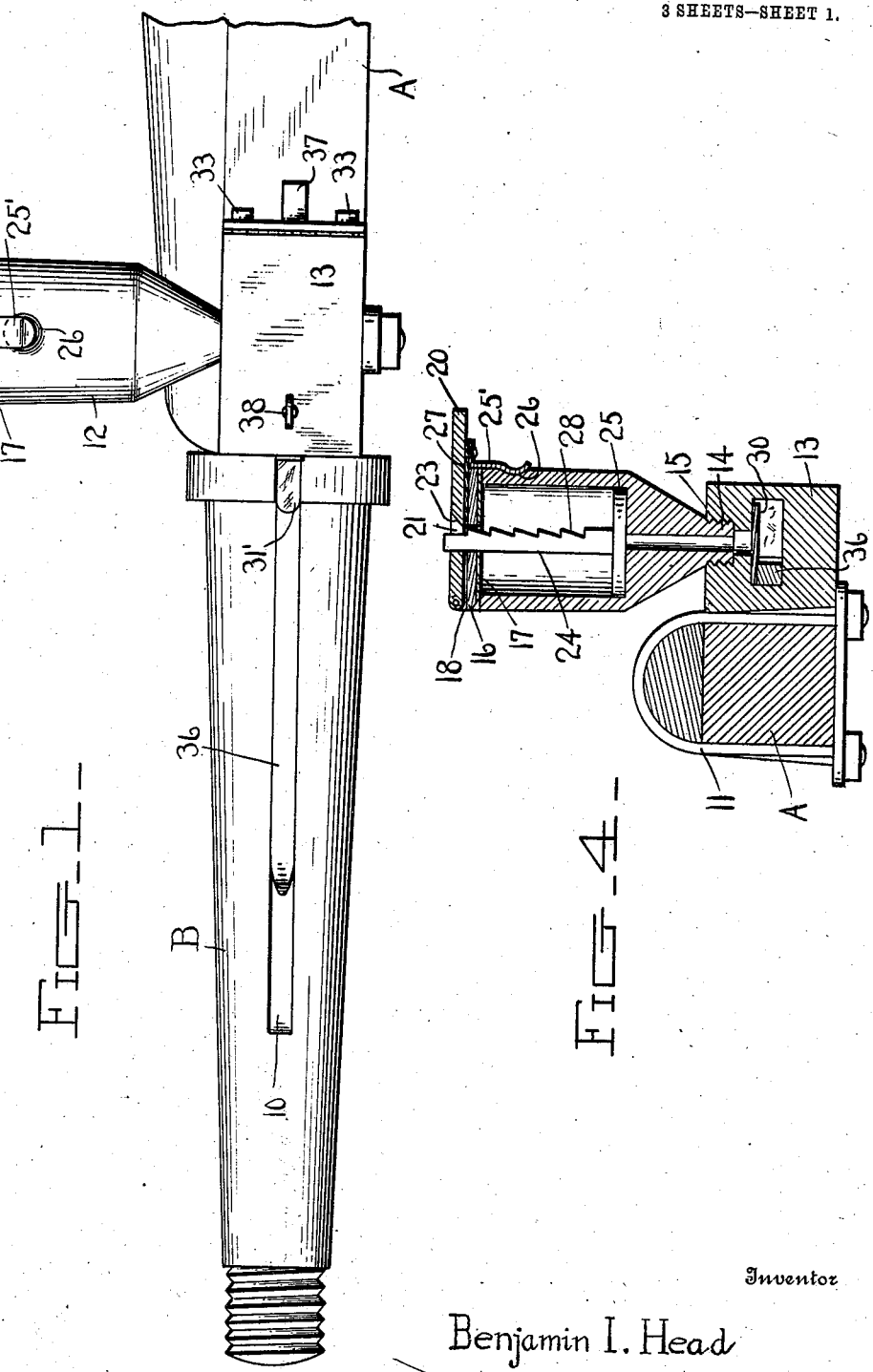
Witnesses
L. B. James
M. J. Miller
Inventor
Benjamin I. Head
By Chandlee & Chandlee
Attorneys No. 893,496.
PATENTED JULY 14, 1908.
B. I. HEAD.
LUBRICATOR.
APPLICATION FILED APR. 1, 1908.
3 SHEETS—SHEET 2.
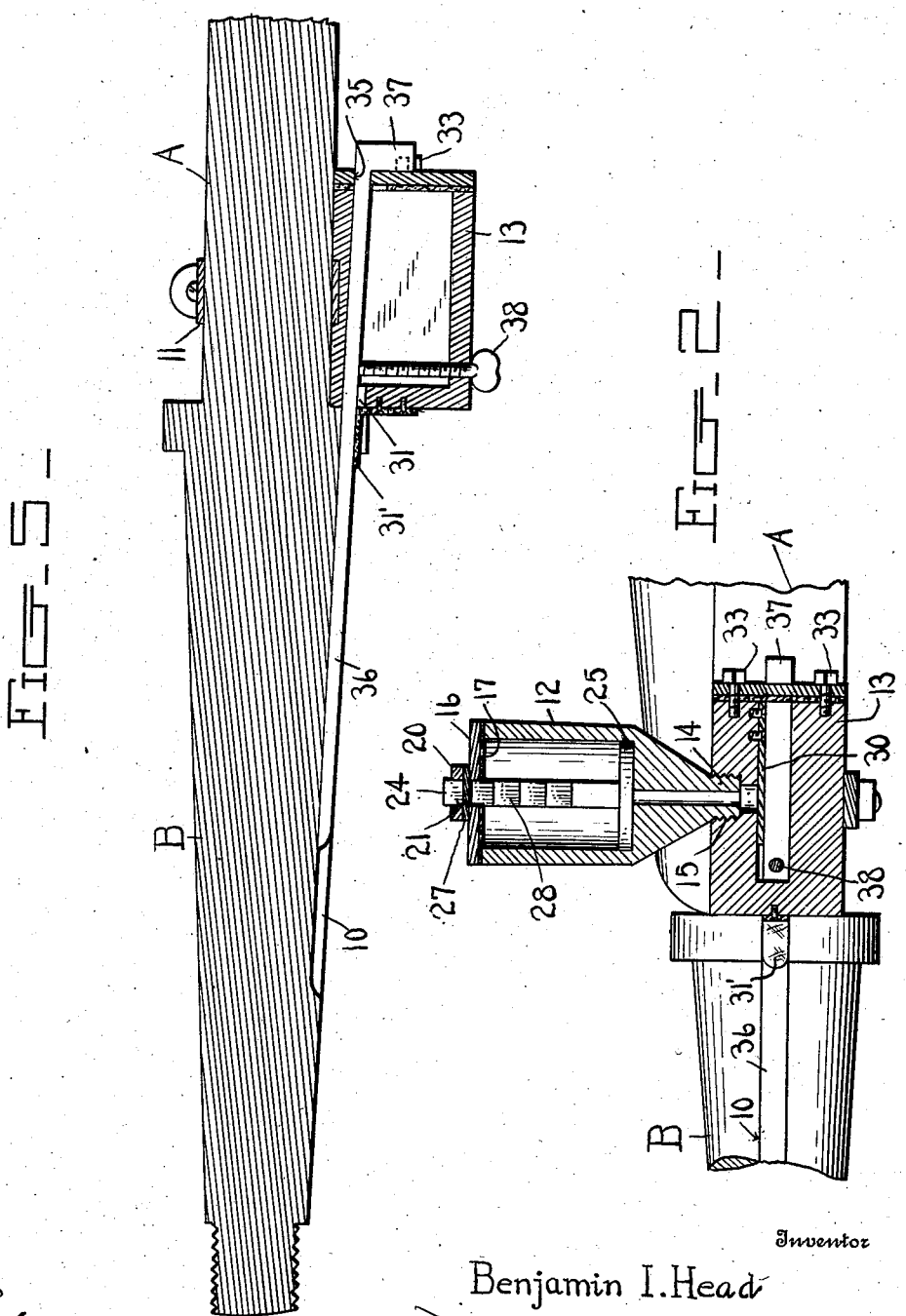
Witnesses
L. B. James
M. T. Miller
Inventor
Benjamin I. Head
By Chandler & Chandler
Attorneys

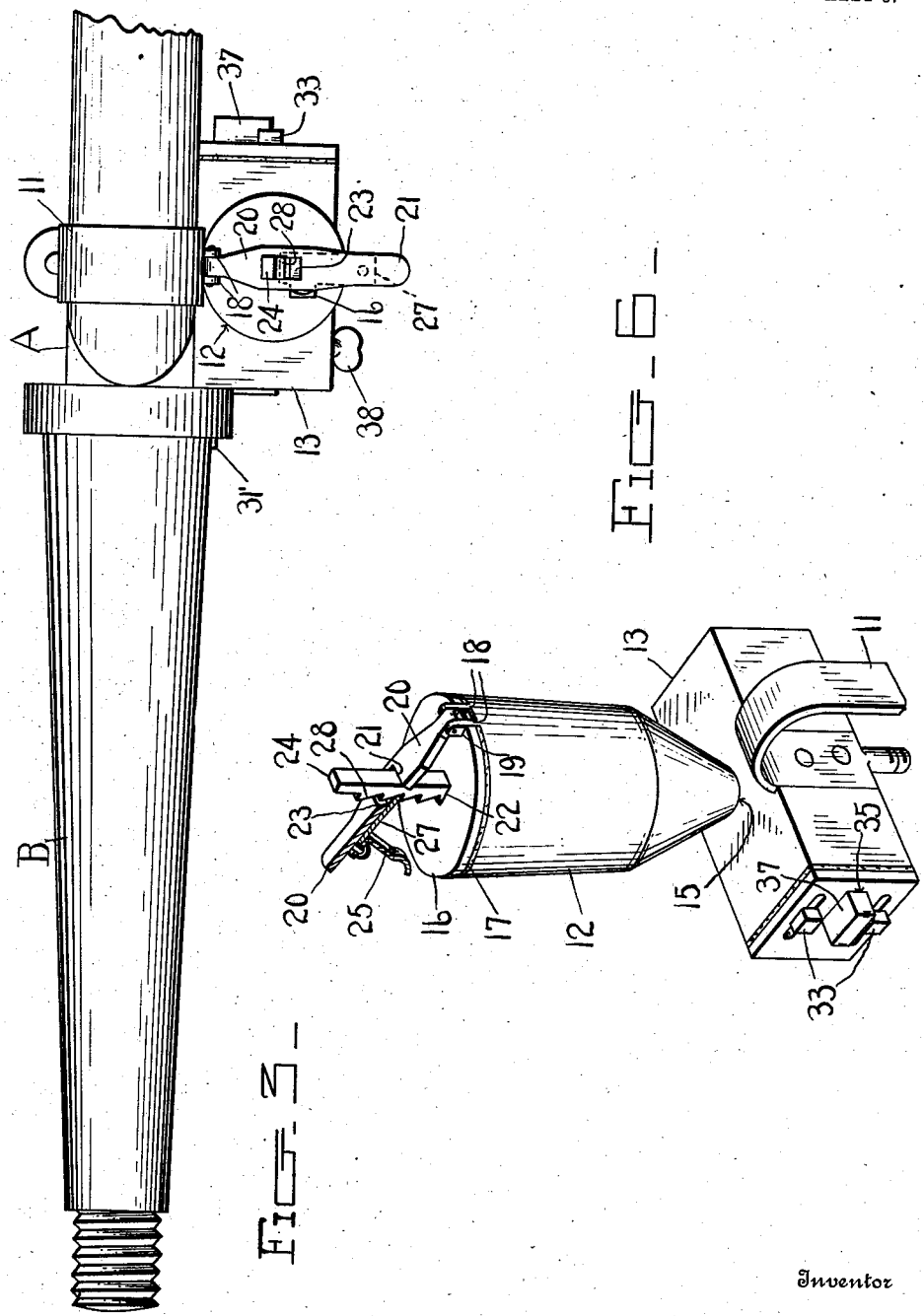

UNITED STATES PATENT OFFICE.

BENJAMIN I. HEAD, OF KIRKWOOD, MISSOURI.

LUBRICATOR.

No. 893,496.  Specification of Letters Patent.  Patented July 14, 1908.

Application filed April 1, 1908. Serial No. 424,615.

*To all whom it may concern:*

Be it known that I, BENJAMIN I. HEAD, a citizen of the United States, residing at Kirkwood, in the county of St. Louis, State of Missouri, have invented certain new and useful Improvements in Lubricators; and I do hereby declare the following to be a full, clear, and exact description of the invention, such as will enable others skilled in the art to which it appertains to make and use the same.

This invention relates to lubricators and more particularly to that class which is designed for use in connection with vehicle axles.

In the present forms of lubricators, lubricant is fed into grooves which are formed in the spindle and is taken up by the bearing box of the hub during the rotation of the wheels, but this manner of distributing the lubricant is at times undesirable for the reason that very little lubricant is taken up and as a consequence its distribution is slow. In carrying out my invention, I therefore have in view the provision of a lubricator which is so constructed that the lubricant may be forced into the groove in the spindle and then forced from the groove by inserting into the groove fillers.

Another feature of my invention resides in the provision of a valve box into which the lubricant container discharges, there being a valve in this box to prevent flow of lubricant from the container except when under pressure.

In the accompanying drawings, Figure 1 is a view in elevation of a vehicle axle spindle showing the application of my invention thereto, Fig. 2 is a vertical transverse sectional view through the lubricator, Fig. 3 is a top plan view of the lubricator and spindle, Fig. 4 is a vertical sectional view taken from front to rear and in a plane with the stem of the follower within the lubricant container, Fig. 5 is a horizontal sectional view taken in a plane with the groove in the vehicle axle spindle, and, Fig. 6 is a detail perspective view of the lubricator, the arm through which the stem of the follower passes being shown raised.

In the drawings, there is shown a vehicle axle indicated by the reference character A and its spindle B, the said spindle being formed with a longitudinally extending groove 10 into which lubricant may be forced or fed.

The lubricating device embodying my invention is secured upon the axle adjacent the butt end of the spindle by means of a suitable clip 11 and the said device comprises, in the main, a lubricant container 12 and a valve box 13. The lubricant container 12 has a reduced threaded discharge end 14 which is fitted into a threaded opening 15 formed in the upper wall of the valve box 13, it being understood that lubricant is in this manner fed from the container into the said box.

I will first specifically describe the container and then describe the instrumentalities provided for regulating the flow of lubricant therefrom, through the valve box and to the channel or groove 10.

The container mentioned above is cylindrical in form and has its upper end normally closed by means of a flat disk-like cap plate 16, which upon its under side is provided with a facing of leather or rubber indicated by the numeral 17, it being understood that normally the cap plate is to be held firmly against the upper end of the container and that the lining insures against entrance of dust, etc., into the container. At its upper end, the body 12 of the container is formed with a pair of ears 18 and the cap plate 16 is formed in its periphery with two notches 19 in which these ears are received, that portion of the cap plate between the notches constituting in effect a tongue which projects between the said ears. Pivoted between these ears 18 is an arm 20, the pivot point of the arm being so located that the arm may be moved to rest flat against the top of the cap plate 16. The arm is formed between its ends with an opening 21 which is normally in registration with an opening 22 formed in the cap plate 16, one wall of the opening 21 in the arm 20 being beveled as indicated by the numeral 23 so as to permit of the arm being swung vertically from such position as to rest upon the cap plate 16 and without being interfered with in this movement by the stem 24 of a follower, the head of which is indicated by the numeral 25, it being understood of course that the follower works vertically in the container 12 and has its stem projected upwardly through the openings 21 and 22. Secured to the arm 20 adjacent its outer end is a leaf spring catch 25' which, when the arm 20 is swung downwardly to bear against the upper side of the cap plate 16, seats in a recess 26 formed in the container 12, the arm being held by such engagement of the catch in the recess, in the position stated.

It will of course be understood from the description so far given of the device that lubricant may be forced from the container 12 by pushing down on the follower stem 24 to feed the follower downwardly in the said container, and in order that the follower may be held in lowered position after having been so moved, I have provided a detent 27 which is swiveled upon the underside of the arm 20 and which may be swung into engagement with any one of a plurality of rack teeth 28 which are formed upon the said stem of the follower.

As has heretofore been stated, the container is mounted upon a valve box, and this box has arranged within it a spring controlled flap valve 30 which normally closes the opening 15 in the top wall of the said valve box. One end of the box is formed with a port 31 which communicates with the groove or channel 10 in the axle spindle, and secured to the said end of the valve box is a short strip of elastic packing material 31', and this strip of packing material extends a short distance into the groove at its inner end. The other end wall of the valve box is removable and also adjustable, it being held in place by means of bolts or screws 33 which are passed through slots formed therein and are screwed into the corresponding end edges of the top and bottom walls of the box.

From the description of the construction of the end wall of the valve box, it will be understood that the said wall may be adjusted in a direction from side to side of the said box, and the purpose of this adjustment will be presently fully explained. The said end wall is also formed with an opening 35 in which is engaged a filler 36, the said filler being also passed through the port in the other end wall of the valve box and the groove 10, although the end which is inserted into the groove terminates short of the outer end of the groove as is clearly shown in the drawings. This end of the filler is tapered to permit of its ready insertion through the several openings, and the other end of the filler is formed with a head 37. A set screw 38 is engaged through the front wall of the valve box 13 and bears at its end against the filler 36, it being understood that in this manner, the filler may be held at any desired adjustment or in other words may be moved to bring more or less of its length to the groove or channel 10 in the spindle. The adjustment of the adjustable end wall of the box, heretofore described, permits of lateral adjustment of the filler as will be readily understood so that the filler may be laterally adjusted to permit of its easy removal or movement longitudinally in the box and groove.

From the foregoing description of my invention it will be understood that when it is desired to thoroughly lubricate the spindle, the follower 24 is depressed so as to force a quantity of lubricant from the container 12 into the valve box 13 and the filler 36, having been previously removed, is inserted into the box and shoved into place in the groove 10 thus forcing the lubricant contained in the groove out to the surface of the spindle and the bearing box of the wheel hub upon the spindle.

What is claimed, is:—

1. The combination with a spindle having a groove, of an oil container, a valve box into which the oil container discharges, and a filler passed through the valve box and into the said groove.

2. The combination with a spindle having a groove, of an oil container, a valve box into which the oil container discharges, and a filler slidably engaged through said valve box and in the said groove.

3. The combination with a spindle having a groove, of an oil container, a valve box into which the oil container discharges, the said box being provided with a port which establishes communication between the interior of the box and the groove, and a filler inserted through the box, the port therein, and into the groove.

4. The combination with a spindle having a groove, of an oil container, a valve box into which the oil container discharges, a filler inserted through said valve box and into said groove, and means for holding said filler at various adjustments.

5. The combination with a spindle having a groove, of an oil container, a follower arranged for vertical movement in said container, an arm pivoted to the container at the upper end thereof and formed with an opening through which the stem of the follower passes, and a detent carried by the arm and engageable with the stem of the follower to hold the follower at various adjustments.

6. The combination with a spindle having a groove, of an oil container arranged to discharge into said groove, a follower received in said container for vertical movement therein, an arm through which the stem of the follower passes, a detent carried by the arm and engageable with the stem of the follower to hold the follower at various adjustments, and means for holding the arm rigid.

7. The combination with a spindle having a groove, of an oil container arranged to discharge into said groove, a follower received for vertical movement in said container, an arm pivoted at the upper end of the container and provided with an opening through which the stem of the follower passes, the said stem being formed with a plurality of rack teeth, and a detent pivoted to the arm and movable into engagement with the teeth interchangeably.

8. The combination with a spindle having a groove, of an oil container arranged to discharge into said groove, a follower slidably disposed within said container, a cover for the container, an arm pivoted at the upper end of the container, means at the outer end of the arm for holding it to bear downwardly upon the said cover and hold the cover in place, the stem of the follower being projected through the cover and the arm, and a detent carried by the arm and engageable with the stem of the follower.

9. The combination with a spindle having a groove, of an oil container arranged to discharge into said groove, a follower slidably disposed within said container, a cover for the container, an arm pivoted at the upper end of the container, means at the outer end of the arm for holding it to bear downwardly upon the said cover and hold the cover in place, the stem of the follower being projected through the cover and the arm, and a detent engageable with the stem of the follower.

10. The combination with a spindle having a lubricating groove, of an oil container arranged to discharge into said groove, said container being formed at its outer end with a pair of ears, a cover for the container provided in its periphery with notches to receive said ears, the portion of the cover between the notches forming a tongue which projects between the ears, an arm pivoted at one of its ends between the ears and directly above the cover, said arm being movable to rest upon the cover, means at the outer end of the arm for holding the arm in such position, and a follower formed with a stem which projects through the cover and the arm, the body or head of the follower being received in said container.

In testimony whereof, I affix my signature, in presence of two witnesses.

BENJAMIN I. HEAD.

Witnesses:
F. M. DODGE,
P. A. SERREST.